3,053,887
ESTERIFICATION OF ISO-OLEFINS
Robert S. Aries, Stamford, Conn.
(76 Ave. Paul Doumer, Paris 16, France)
No Drawing. Filed Nov. 3, 1959, Ser. No. 850,528
4 Claims. (Cl. 260—497)

This invention relates to a novel process for the esterification of olefins and to a novel catalyst therefor. More particularly, the invention is concerned with the preparation of tertiary alkyl esters of aliphatic organic acids by reacting an iso-olefin with a concentrated aliphatic acid in presence of a porous bead type ion exchange resin esterification catalyst.

In my co-pending application Serial No. 805,678, filed April 13, 1959, I have disclosed a process for the production of tertiary alkyl esters of aliphatic organic acids by reacting an iso-olefin with a concentrated aliphatic acid in the presence of a non-acid esterification catalyst such as silica-magnesia, silica-alumina, or activated montmorillonite clay. As an example, I reacted iso-butylene with glacial acetic acid in the presence of a silica-magnesia catalyst at 80° C. and 200 p.s.i. pressure to give a yield of 75.4% of theory based on isobutylene consumed and using in excess of the stoichiometric amount of acetic acid. While this represents an important advance over previously known methods of preparing tertiary butyl acetate from isobutylene and acetic acid, as, for instance, by condensing them using sulfuric acid as catalyst, it is still not completely satisfactory because for large scale industrial use of tertiary butyl acetate economically it is desirable to lower the costs of production still further by a more efficient utilization of the raw materials, isobutylene and acetic acid. The optimum conditions would be to use stoichiometric amounts of isobutylene and glacial acetic acid to achieve a substantially quantitative reaction according to the equation:

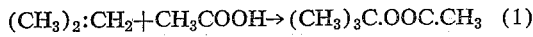
$$(CH_3)_2{:}CH_2 + CH_3COOH \rightarrow (CH_3)_3C.OOC.CH_3 \quad (1)$$

This reaction, if quantitative, would represent the lowest possible material cost for producing tertiary butyl acetate, as the raw materials would be used fully.

I have discovered, surprisingly and unexpectedly, that the desired results can be obtained by using certain partially cross-linked sulfonated porous ion exchange resins as the catalyst for the esterification of olefins such as isobutylene, by acetic acid and other aliphatic carboxylic acids. The resins which are suitable are bead type, porous, sulfonated copolymers of styrene and divinylbenzene and/or ethylvinylbenzene and are available in industry from various manufacturers in several different physical forms. For use as a catalyst in the present process, the resin must be in porous form to afford high surface area. Using these resins with their nuclear sulfonated polystyrene matrix structure there is a minimum of polymerization of isobutylene. The formation of polymer is further minimized by the use of low temperature.

It is well known and confirmed by experiment that acidic catalysts including the hydrogen (acid) form of ion exchange resins cause polymerization concurrently with esterification in the reaction of olefins with organic acids at elevated temperatures, and even the organic acid tends to cause polymerization.

To overcome the uneconomic effect of polymerization I have attempted to carry out the esterification at lower temperatures to avoid polymerization, but I have found that resins of the type described do not ordinarily cause esterification at temperatures as low as 10° C.–0° C. which is desirable to prevent polymerization. I have found unexpectedly that if the resin is highly porous the rate of esterification is sufficiently high to be industrially useful and economical without the undesired and uneconomical production of polymeric material. I believe that this is because the reaction occurs at the surface of the solid resin and that the number or areas of reactive sites is very small in the resins of the usual structure whereas the number or areas of reactive sites is greatly increased if the resin is porous.

The use of ion exchange resins as catalysts for the esterification of olefins is proposed in U.S. Patent 2,678,332, mention being made therein of solid sulfonic or carboxylic acid types. The types of resins suggested in the patent, which are not porous, tend to possess low activity at reduced temperatures, necessitating the use in the examples of the patent of esterification temperatures of 100° C. to 120° C. At these elevated temperatures, polymerization of the olefin in presence of the acid takes place, confining ester yields to about 50 mole percent. The use of porous bead type resins as catalysts, in accordance wtih this invention, enables ester yields to be obtained of 92.2% of theory, as shown in the accompanying examples, and under stable conditions of continuous operation, as high as 95–96% of theory.

As examples of porous bead-type sulfonated ion exchange resins which may be advantageously employed as catalysts in accordance with my invention, there are mentioned Duolite C–25 (manufactured by Chemical Process Company, Redwood City, California) which is described by the manufacturer as a porous styrene sulfonic acid crosslinked with from about 5.5–8% divinylbenzene, weighing about 40 lbs. per cubic foot when moist. Another suitable catalyst resin is Amberlite X–100 (manufactured by Rohm and Haas Company, Philadelphia, Pennsylvania), described by the manufacturer as a porous strongly acidic cation exchange resin of the sulfonated polystyrene-divinylbenzene cross linked type, in bead form, available from 16 to 40 mesh particle size.

As a starting material for carrying out the novel process of this invention, there may be employed either the substantially pure iso-olefin or a mixture of olefins in which the iso-olefin is present in sufficiently high concentration. Thus, I may use as a starting material a mixture of unseparated isobutylene and other butylenes, such as, for example, butene-1 and butene-2.

As the acid component of the esterification reaction there may be employed an aliphatic organic acid, and particularly a lower alkanoic acid, such as, for example, acetic acid, propionic acid, butyric acid, or isobutyric acid, in concentrated form, such as glacial acetic acid, or the anhydrides of these acids. By concentrated is meant that the acid is of a strength between about 99–100%.

Esterification is usually considered as an equilibrium reaction in which hydrolysis of the ester proceeds simultaneously with esterification of the components to yield an equilibrium mixture, and this is true if the reactants are an alcohol and an acid, when the reversible reaction is:

$$ROH + HA \rightleftharpoons RA + H_2O \quad (2)$$

in which ROH is an alcohol, HA and acid and RA the ester. But in the esterification of an olefin by an acid, of which Equation 1 is an example, a molecule of water is not liberated and the reverse reaction of hydrolysis toward the left as in Equation 2 cannot occur, so that Equation 1 proceeds substantially quantitatively toward the right except for the production of by-products by some reaction which is not a hydrolysis reaction. There may theoretically be polymerization, but in my present novel method I have found that polymerization does not occur, although I have found that some polymerization does occur as noted in the method claimed in Serial No. 805,678. The polymerization becomes quite negligible if the temperature within the reactor is kept below +5° C., and preferably at 0° C.

The necessary condition to prevent hydrolysis in using the resin as catalyst is that it be free of water, and I have rendered the catalyst free of water by displacing its water content completely by anhydrous acetic acid. This can be achieved by the use of a displacement flow of glacial acetic acid to remove the water, or by the use of glacial acetic acid containing a small amount (1 or 2%) of acetic anhydride. Any diluted acetic acid produced by such a preliminary washing or displacement procedure can be fortified for re-use by addition of enough acetic anhydride to bring it up to an acetic acid content of 100% or slightly higher; for instance, 100.5%, as determined by titration with standardized caustic solution.

Among the resins I have found satisfactory as catalysts in carrying out my novel procedure are commercial polystyrene matrix resins, which are copolymers of polystyrene, divinylbenzene and/or ethylvinyl benzene which are post-sulfonated and have a relatively large pore size and relatively large total porosity. They are available commercially in bead form of approximately 0.45–0.60 mm. particle diameter. The commercial sodium form as supplied by the manufacturer was converted to the acid by means of 5% sulfuric acid solution at ordinary ambient temperatures as recommended by the manufacturers and washed free of excess sulfuric acid by extensive washing with demineralized water. After the excess water was drained from the column the remaining water was displaced by glacial acetic acid or glacial acetic acid containing 2% of acetic anhydride, until the effluent acetic acid analyzed 100% acetic acid content. This resin in the acid form moistened with acetic acid was used as the esterification catalyst.

Porosity of the resin is apparently essential since the reactants react only at reactive sites of the solid catalyst and diffusion of the reactants into the resin particles is necessary. It is considered that the esterification occurs only at the reactive sites because resins of the same chemical structure but of low porosity were not effective catalysts for the esterification reaction.

The following examples serve to illustrate the invention, but it is not to be considered as limited thereto:

*Example 1*

The reaction was carried out on a small scale, using a liter stainless steel flask set in a large bath of crushed ice and water. The flask was provided with a thermometer indicating the temperature of the charge in the liquid, a low speed stirrer and an inlet and outlet opening. A charge of 300 grams of 90% acetic acid-10% acetic anhydride (freezing point as tested separately 9° C.) and 60 grams of resin wet with acetic acid and freed from water (60 grams dry weight of resin) was placed in the reactor and stirred and when the temperature indicated was 10° C. isobutylene was bubbled in at the rate of 100 grams per hour for 3½ hours, the temperature after the first few minutes being allowed to drop to as close to 0° C. as the bath would permit (about 2° C.). The addition of isobutylene lasted for 3½ hours with constant agitation and in the last three quarters of an hour some isobutylene escaped. The agitation was continued for an additional hour without adding isobutylene at 2° C. The liquid charge was decanted on to a filter and carefully filtered to remove resin particles and the filtrate was 565 grams. To this was added 5 grams of anhydrous sodium acetate to prevent hydrolysis during the subsequent distillation by residual traces of sulfuric acid which might have been leached from the resin. The liquid product was then distilled, 8 grams boiling below 91° C., and 542 grams of tertiary butyl acetate, boiling point 91° C.–96° C., was obtained, with a residue in the flask which was essentially the dimer of isobutylene. The yield was thus 93.4% of theory on the acetic acid used, and 74.7% on the isobutylene supplied, which was used in excess.

Care was taken throughout to keep all materials as free from moisture as possible and a second charge was run with the same portion of catalyst and the yield was increased to 97.2% on the acetic acid used. Three more charges were run on the same portion of catalyst without any apparent decrease in activity of the catalyst.

A run made with 30 grams (dry weight) of catalyst and the same conditions otherwise as above including amounts of reactants reduced the yield somewhat to 91%.

A run made with the full 60 grams (dry weight) of catalyst at 10° C. reduced the yield and increased the amount of residue in the distillation. Another run under the same conditions except that the temperature was raised to 15° C. further reduced the yield and increased the amount of residue in the distillation. Thus it is evident that the optimum temperature of the catalyzed reaction is approximately 0° C. In view of the repeated utilization of the catalyst it was considered that continuous operation was easily feasible and the following continuous run was made.

The continuous reactor used was a vertical stainless steel pipe, 4 inches in inside diameter and 100 inches in length, flanged at both ends. This reactor was water jacketed to provide temperature control and the outlet from the top was connected to a release valve set at 50 p.s.i.g. On the flange constituting the bottom within the reactor was placed a stainless steel wire gauze circle supported by crumpled stainless steel gauze to provide a free space below the bottom of the catalyst column. The sodium form of the resin was poured in from the open top of the pipe to a depth of about 12 inches, and followed by a circular stainless steel gauze 3¾ inches in diameter, then about 12 inches of resin, gauze, resin, etc., until a column 72 inches high of resin was established. About 24 pounds of resin were found necessary to load the column to 72 inches in height.

The resin was converted in situ in the unit by passing 5% sulfuric acid solution downward in the amount of 100 pounds, at the rate of 50 pounds per hour. The resin was then washed with 500 pounds of demineralized water at 250 pounds per hour. The resin was then washed with 2% sulfuric acid, 100 pounds at the rate of 50 pounds per hour, and then with 500 parts of demineralized water at 250 pounds per hour. The final effluent was substantially neutral. Then the column was washed with glacial acetic acid containing 2% of acetic anhydride at the rate of 1 pound per minute until the effluent analyzed 100% acetic acid. About 600 pounds of glacial acetic acid were necessary (10 hours). The column was then ready for use in the esterification reaction.

A contact time of about 5 hours was found desirable at a pressure of 50 p.s.i.g. and a temperature of 0° C. was provided by running brine at —5° C. through the jacket. Since the resin bed has a volume of approximately 0.5 cubic foot, about 0.1 cubic foot of 90% acetic acid-10% acetic anhydride mixture (6.25 lbs.) was pumped in per hour from the top while 6.0 lbs. per hour of isobutylene were forced from a cylinder into the bottom of the reactor below the column. The temperature was maintained at 0° C. by circulating brine at —5° C. through the jacket at 2 gallons per minute. As the isobutylene passed up through the resin bed, esterification occurred and excess isobutylene escaped through the upper vent valve set to release at 50 p.s.i.g. The level of liquid in the column was held just above the top of the resin bed by a liquid level controller actuating a pump which drew off liquid product from the bottom to a storage tank.

Until the unit was in full operation for one hour, the preliminary production was rejected, and the product thereafter was collected. In the course of 10 hours of stabilized operation the amount of product collected was 120 pounds. An aliquot of 2.5 kilos with 10 grams of anhydrous sodium acetate was distilled from a 5 liter flask and yielded 87 grams to 91° C.
2321 grams 91° C. to 96° C. (tertiary butyl acetate)
92 grams residue and loss This represents a yield of 92.2% of theory on the acetic acid used. Under long-run continuous operation the yield reached 95–96% of theory.

*Example 2*

A run similar to that of Example 1 with propionic acid at 0° C., using 1.1 mols of isobutylene per mol of propionic acid gave a yield of 93% of tertiary butyl propionate, boiling point 116–119° C.

I claim:

1. Method for the production of a tertiary butyl ester of a lower alkanoic acid which comprises reacting isobutylene with a lower alkanoic acid in the presence of an esterification catalyst comprising beads of a sulfonated copolymer of styrene and a cross-linking compound consisting of divinylbenzene, said beads having a porous structure, at a temperature below about 5° C.

2. Method for the production of tertiary butyl acetate which comprises reacting isobutylene with glacial acetic acid in the presence of an esterification catalyst comprising beads of a sulfonated copolymer of styrene cross-linked with divinyl benzene, said beads having a porous structure, at a temperature below about 5° C.

3. Method for the production of tertiary butyl acetate which comprises reacting isobutylene with glacial acetic acid in the presence of an esterification catalyst comprising beads of a sulfonated copolymer of styrene cross-linked with divinyl-benzene, said catalyst having been previously freed of water by washing with anhydrous acetic acid, said beads having a porous structure, at a temperature below about 5° C.

4. The method of claim 1 in which the lower alkanoic acid is propionic acid.

References Cited in the file of this patent

UNITED STATES PATENTS 2,678,332    Cottle _____ May 11, 1954

OTHER REFERENCES

Bodamer et al., Ind. Eng. Chem. 43, 1082–1085 (1951).

Houben-Weyl, "Die Methoden Der Organischen Chemie," "Sauerstoffuerbindungen III," 1952, 4th edition, pages 534–535.

Helfferich, Agnew, Chem. 66, 241–249 (1954).

Nachod et al., "Ion Exchange Technology," 1956, pages 11, 12 and 272–284.